United States Patent
Watanabe et al.

(10) Patent No.: US 12,214,778 B2
(45) Date of Patent: Feb. 4, 2025

(54) PARKING ASSISTANCE METHOD AND PARKING ASSISTANCE DEVICE

(71) Applicant: Nissan Motor Co., Ltd., Yokohama (JP)

(72) Inventors: Takeshi Watanabe, Kanagawa (JP); Yasuhiro Suzuki, Kanagawa (JP); Muku Takeda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/712,586

(22) PCT Filed: Nov. 29, 2021

(86) PCT No.: PCT/JP2021/043652
§ 371 (c)(1),
(2) Date: May 22, 2024

(87) PCT Pub. No.: WO2023/095341
PCT Pub. Date: Jun. 1, 2023

(65) Prior Publication Data
US 2025/0010846 A1  Jan. 9, 2025

(51) Int. Cl.
*B60W 30/06* (2006.01)

(52) U.S. Cl.
CPC ..... *B60W 30/06* (2013.01); *B60W 2554/4041* (2020.02); *B60W 2720/10* (2013.01)

(58) Field of Classification Search
CPC .......... B62D 15/0285; B62D 15/0265; B60W 30/06; B60W 2720/10; B60W 2554/4041;
(Continued)

(56) References Cited

U.S. PATENT DOCUMENTS

| 8,170,752 | B2 | 5/2012 | Shimazaki et al. |
| 10,668,919 | B2 | 6/2020 | Takahashi et al. |

(Continued)

FOREIGN PATENT DOCUMENTS

| CN | 101765527 A | 6/2010 |
| JP | 2016-192164 A | 11/2016 |

(Continued)

*Primary Examiner* — Kenneth J Malkowski
(74) *Attorney, Agent, or Firm* — Young Basile Hanlon & MacFarlane, P.C.

(57) ABSTRACT

A parking assistance method including: detecting a target object position that is a relative position with respect to the own vehicle; retrieving a known target object and a relative positional relationship between the known target object and a target parking position from a storage device; based on the detected target object position detected and a relative positional relationship between the known target object and a target parking position, estimating a relative position of the target parking position with respect to a current position of the own vehicle; based on the estimated relative position, calculating a target travel trajectory from a current position of the own vehicle to the target parking position; determining estimation precision of the estimated relative position; when the estimation precision is low, limiting a speed limit of movement speed at which the own vehicle is caused to travel along the target travel trajectory to a speed lower.

9 Claims, 3 Drawing Sheets

(58) Field of Classification Search
CPC ........ G08G 1/168; G08G 1/14; G06V 20/586; G06T 2207/30264; G01S 2013/9314
See application file for complete search history.

(56) References Cited

U.S. PATENT DOCUMENTS

| | | |
|---|---|---|
| 10,953,869 B2 | 3/2021 | Iio et al. |
| 2010/0211267 A1 | 8/2010 | Shimazaki et al. |
| 2018/0079408 A1* | 3/2018 | Takahashi ......... B60W 30/0953 |
| 2018/0165960 A1* | 6/2018 | Seo ..................... G06V 20/586 |
| 2019/0039605 A1 | 2/2019 | Iio et al. |
| 2020/0207334 A1* | 7/2020 | Cho ................. G08G 1/096811 |
| 2020/0211400 A1* | 7/2020 | Cho ................... G01C 21/3407 |

FOREIGN PATENT DOCUMENTS

| | | |
|---|---|---|
| JP | 2017-138664 A | 8/2017 |
| JP | 2018-185156 A | 11/2018 |
| JP | 2018/195227 A | 12/2018 |
| JP | 2019-130997 A | 8/2019 |
| JP | 2020-062990 A | 4/2020 |

* cited by examiner

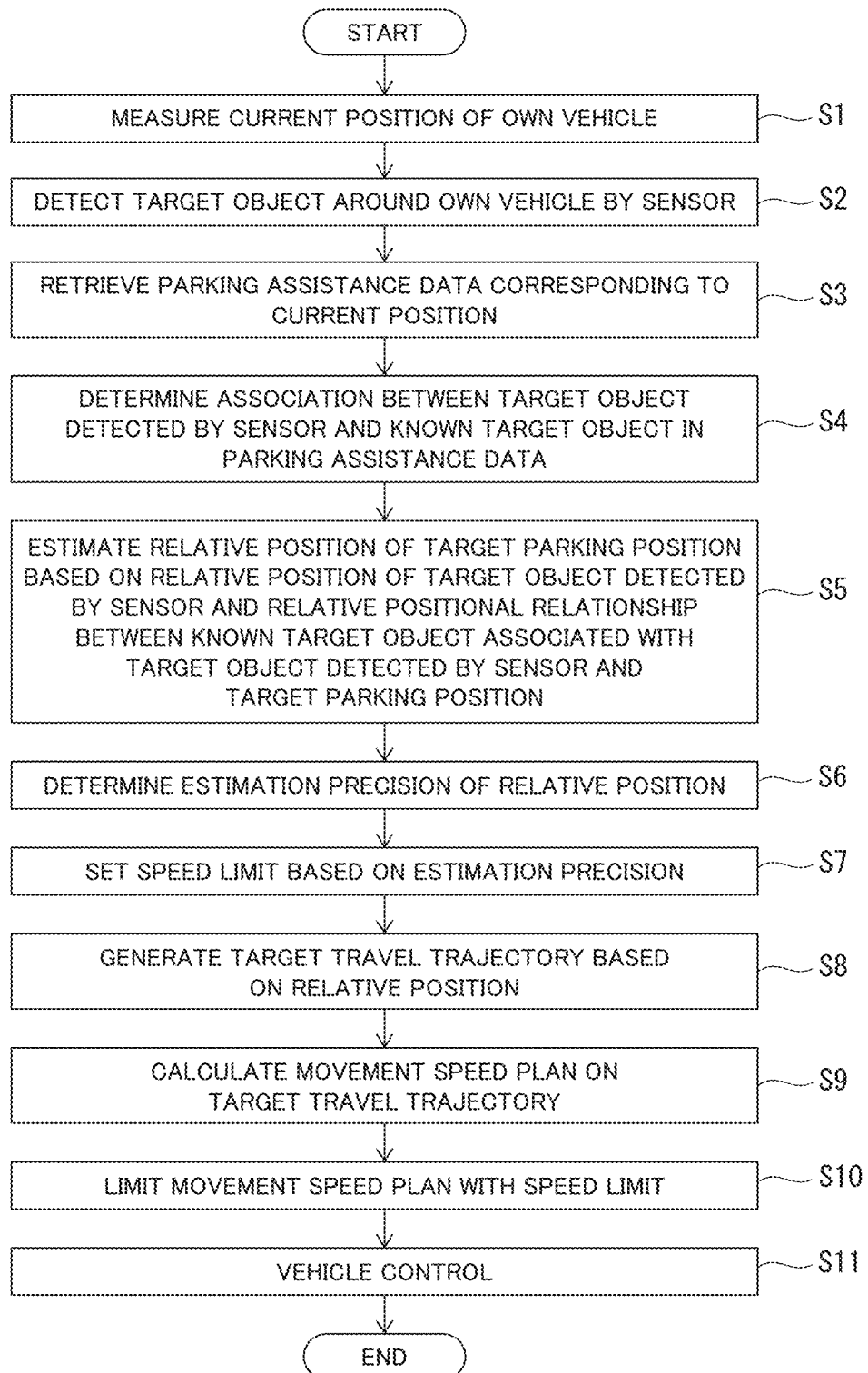

PARKING ASSISTANCE METHOD AND PARKING ASSISTANCE DEVICE

TECHNICAL FIELD

The present invention relates to a parking assistance method and a parking assistance device.

BACKGROUND

In JP 2017-138664 A described below, a technology to recognize and store a feature point around a target parking position, calculate a relative position of the target parking position with respect to an own vehicle, based on a relative position of the own vehicle with respect to the stored feature point, and cause the own vehicle to autonomously move to the target parking position, based on the calculated relative position is described.

SUMMARY

However, when the own vehicle is caused to move based on the relative position when calculation precision of the relative position between the target parking position and the own vehicle is low, there is a risk that a passenger is given a sense of discomfort.

An object of the present invention is to reduce a sense of discomfort given to a passenger when an own vehicle is caused to move to a target parking position, based on a target object detected by a sensor mounted on the own vehicle and a known relative positional relationship between the target parking position and the target object.

According to an aspect of the present invention, there is provided a parking assistance method including: by a sensor mounted on an own vehicle, detecting a target object around the own vehicle and a target object position, the target object position being a relative position of the target object with respect to the own vehicle; retrieving a known target object and a relative positional relationship between the known target object and a target parking position, the known target object and the relative positional relationship being stored in a predetermined storage device in advance, from the storage device; based on a target object position detected by the sensor and a relative positional relationship between the known target object and a target parking position, estimating a relative position of the target parking position with respect to a current position of the own vehicle; based on the estimated relative position, calculating a target travel trajectory from a current position of the own vehicle to a relative position of the target parking position; determining estimation precision of the estimated relative position; and when the estimation precision is low, limiting a speed limit of movement speed at which the own vehicle is caused to travel along the target travel trajectory to a speed lower than a speed limit when the estimation precision is high.

According to an aspect of the present invention, it is possible to reduce a sense of discomfort given to a passenger when an own vehicle is caused to move to a target parking position, based on a target object detected by a sensor mounted on the own vehicle and a known relative positional relationship between the target parking position and the target object.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 4 is a flowchart of an example of a parking assistance method of the embodiment.

DETAILED DESCRIPTION (Configuration)

Figure 1:
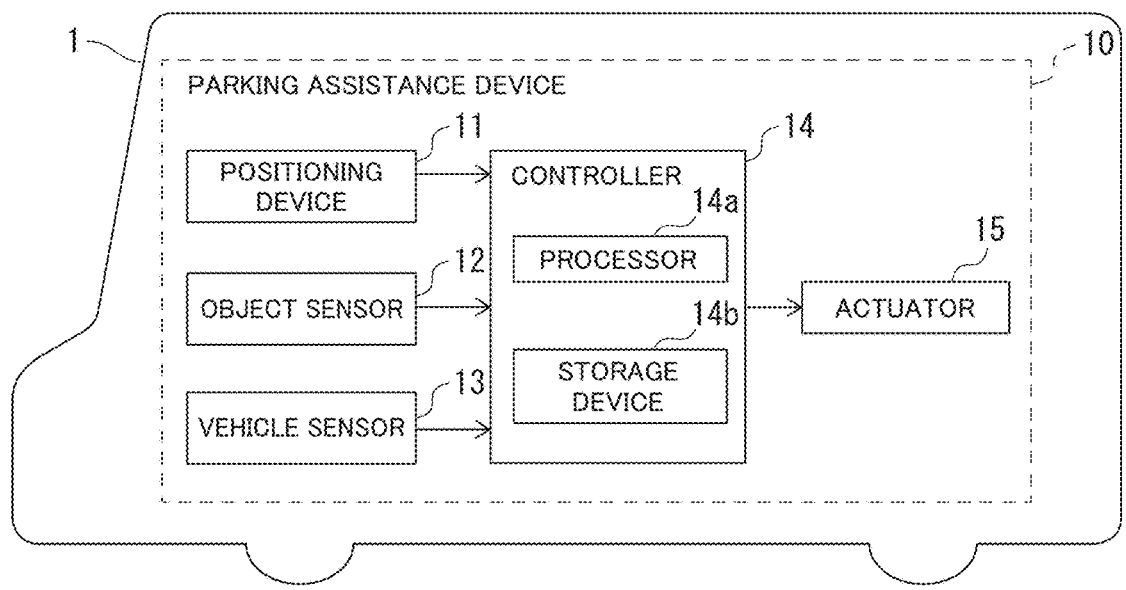
FIG. 1 is a diagram illustrative of an example of a schematic configuration of a parking assistance device of an embodiment.

FIG. 1 is a diagram illustrative of an example of a schematic configuration of a parking assistance device of an embodiment. An own vehicle 1 includes a parking assistance device 10 configured to assist parking of the own vehicle 1 at a target parking position. In parking assistance performed by the parking assistance device 10, a target travel trajectory from a current position of the own vehicle 1 to the target parking position is calculated. In the parking assistance, autonomous driving to control the own vehicle 1 to travel to the target parking position along the target travel trajectory of the own vehicle 1 is performed. The parking assistance device 10 includes a positioning device 11, an object sensor 12, vehicle sensors 13, a controller 14, and actuators 15.

The positioning device 11 measures a current position of the own vehicle 1. The positioning device 11 may include, for example, a global navigation satellite system (GNSS) receiver. The GNSS receiver is a global positioning system (GPS) receiver and receives radio waves from a plurality of navigation satellites and thereby measures the current position of the own vehicle 1.

The object sensor 12 detects an object in a predetermined distance range from the own vehicle 1 (for example, a detection range of the object sensor 12). The object sensor 12 detects a surrounding environment around the own vehicle 1, such as a relative position between an object existing in surroundings around the own vehicle 1 and the own vehicle 1, distance between the own vehicle 1 and the object, and a direction in which the object exists. The object sensor 12 may include, for example, a camera to capture the surrounding environment around the own vehicle 1. The object sensor 12 may include a ranging device, such as a laser range finder (LRF), a radar, or a laser radar like a light detection and ranging (LiDAR).

The vehicle sensors 13 detect various information (vehicle information) that can be acquired from the own vehicle 1. The vehicle sensors 13 include, for example, a vehicle speed sensor configured to detect traveling speed (vehicle speed) of the own vehicle 1, wheel speed sensors configured to detect rotational speed of respective tires that the own vehicle 1 has, a triaxial acceleration sensor (G sensor) configured to detect acceleration (including deceleration) in three axial directions of the own vehicle 1, a steering angle sensor configured to detect a steering angle (including a turning angle), a gyro sensor configured to detect angular velocity generated in the own vehicle 1, and a yaw rate sensor configured to detect a yaw rate.

The controller 14 is an electronic control unit (ECU) that performs parking assistance control of the own vehicle 1. The controller 14 includes a processor 14a and peripheral components, such as a storage device 14b. The processor 14a may be, for example, a central processing unit (CPU) or a micro-processing unit (MPU). The storage device 14b may include a semiconductor storage device, a magnetic storage device, an optical storage device, and the like.

Functions of the controller 14, which will be described below, are achieved by, for example, the processor 14a executing computer programs stored in the storage device 14b. Note that the controller 14 may be formed using dedicated hardware for performing various types of information processing that will be described below.

The actuators 15 operate a steering wheel, accelerator opening, and a braking device of the own vehicle 1 in accordance with control signals output from the controller 14 and thereby generate vehicle behavior of the own vehicle 1. The actuators 15 include a steering actuator, an accelerator opening actuator, and a brake control actuator. The steering actuator controls steering direction and the amount of steering in the steering of the own vehicle 1. The accelerator opening actuator controls the accelerator opening of the own vehicle 1. The brake control actuator controls braking action of the braking device of the own vehicle 1.

Next, an example of the parking assistance control performed by the parking assistance device 10 of the embodiment will be described.

Figure 2A:
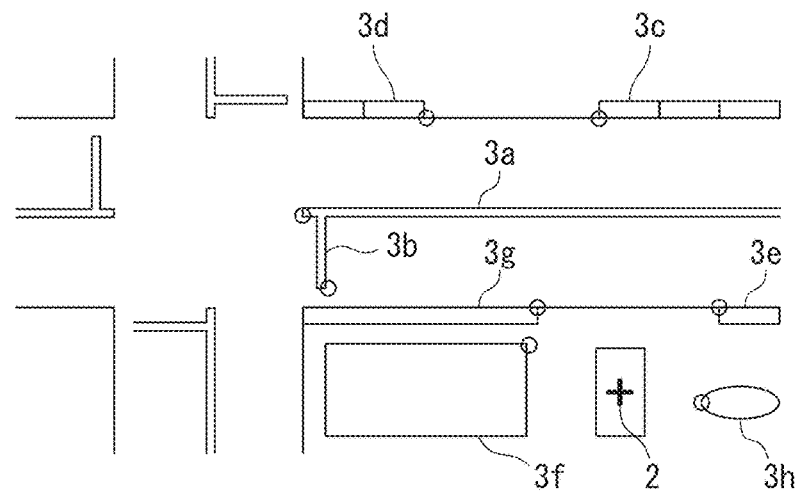
FIG. 2A is an explanatory diagram of an example of learned target objects.

FIG. 2A is now referred to. When a driver makes use of the parking assistance performed by the parking assistance device 10, first, the driver causes the parking assistance device 10 to store a target object existing around a target parking position 2 that is a target position at which the own vehicle 1 is to be parked and a relative positional relationship between the target object and the target parking position 2 in the storage device 14b. The target object is a ground object serving as a mark for specifying the current position of the own vehicle 1 and may be, for example, a pavement marking drawn on a road surface (a lane boundary line 3a, a stop line 3b, a road sign, or the like), a road boundary (curbs 3c to 3e, a guardrail, or the like), or an obstacle (a house 3f, a wall 3g, an object 3h, or the like).

Data obtained by combining a known target object stored in the storage device 14b and a relative positional relationship between the known target object and the target parking position 2 as described above are sometimes referred to as "parking assistance data" in the following description.

In order to cause the parking assistance device 10 to store the parking assistance data in the storage device 14b, an operation mode of the parking assistance device 10 is set to a "target object learning mode". Subsequently, the driver parks the own vehicle 1 at the target parking position 2 by manual driving.

While the own vehicle 1 is moved to be parked at the target parking position 2 by manual driving, the parking assistance device 10 detects a target object around the own vehicle 1 and a target object position that is a relative position of the target object with respect to the own vehicle 1, by the object sensor 12.

For example, the parking assistance device 10 detects edge portions or corner portions of target objects, such as pavement markings (in the example in FIG. 2A, the lane boundary line 3a and the stop line 3b), road boundaries (in the example in FIG. 2A, ground contacting portions of the curbs 3c to 3e), and obstacles (in the example of FIG. 2A, ground contacting portions of the house 3f, the wall 3g, and the object 3h), in a captured image obtained by image capturing using the camera of the object sensor 12, as feature points.

The parking assistance device 10 also calculates feature amounts of the detected feature points. In this configuration, the feature amount may be, for example, vector data calculated from a neighboring area of a feature point in an image. For detection of a feature point and calculation of a feature amount, various methods, such as SIFT, SURF, ORB, BRIAK, KAZE, and AKAZE, can be made use of.

In addition, the parking assistance device 10 calculates, based on positions of feature points in an image and camera information relating to an attachment state (an attachment position, an optical axis angle, and an angle of view) of the camera to the own vehicle 1, relative positions of the feature points with respect to the own vehicle 1.

Note that the parking assistance device 10 may detect a feature point of point group information acquired by the laser range finder, the radar, or the LiDAR. Herein, an example in which a feature point is detected from a captured image will be described.

Next, the parking assistance device 10 calculates a relative positional relationship between a target object (feature point) detected by the object sensor 12 and the target parking position 2. For example, the parking assistance device 10 estimates a current position of the own vehicle 1 in a fixed coordinate system at a time point at which the target object is detected by the object sensor 12 and calculates, based on the estimated current position and the relative position of the target object with respect to the own vehicle 1, a position of the target object in the fixed coordinate system. As used herein, the fixed coordinate system is a coordinate system with the origin set at a specific point (for example, a map coordinate system). Next, the parking assistance device 10 detects a position of the own vehicle 1 when the own vehicle 1 is positioned at the target parking position 2, as a position of the target parking position 2 in the fixed coordinate system. The position of the target object and the position of the target parking position 2 being determined in the fixed coordinate system causes a relative positional relationship between the target object and the target parking position 2 to be determined.

The current position of the own vehicle 1 in the fixed coordinate system may be estimated by, for example, the positioning device 11, odometry, or dead reckoning. The current position of the own vehicle 1 in the fixed coordinate system may be estimated by map mapping or the like between a target object detected by the object sensor 12 and a known target object position or high-definition map information storing target object positions in advance.

In addition, the parking assistance device 10 may calculate a relative positional relationship between a target object and the target parking position 2, based on the target object position that is detected by the object sensor 12 when the own vehicle 1 is positioned at the target parking position 2.

The parking assistance device 10 stores parking assistance data obtained by combining information about a target object (that is, a feature amount of a feature point) and a relative positional relationship between the target object and the target parking position 2, in the storage device 14b. The parking assistance device 10 may store, as data of a relative positional relationship, the position of a target object and the position of the target parking position 2 in the fixed coordinate system or the position of a target object in a fixed coordinate system with the coordinate origin set at the target parking position 2. Hereinafter, a target object stored in the storage device 14*b* is sometimes referred to as a "learned target object".

Circular marks in FIG. 2A represent learned target objects stored in the storage device 14*b*.

The parking assistance device 10 may store, with respect to each of a plurality of different target parking positions, parking assistance data for performing parking assistance at the target parking position, in the storage device 14*b*.

When the parking assistance data are stored in the storage device 14*b*, parking assistance performed by the parking assistance device 10 becomes ready to use. In order to use the parking assistance, the operation mode of the parking assistance device 10 is set to a "parking assistance mode".

In the parking assistance mode, the parking assistance device 10 retrieves the parking assistance data from the storage device 14*b*. When parking assistance data is stored with respect to each of the plurality of different target parking positions, the parking assistance device 10 selects and retrieves parking assistance data that are stored with respect to a target parking position at which the own vehicle 1 is to be parked.

For example, the parking assistance device 10 may retrieve parking assistance data corresponding to the current position of the own vehicle 1 measured by the positioning device 11. For example, the parking assistance device 10 may retrieve parking assistance data that are stored with respect to a target parking position closest to the current position of the own vehicle 1.

In addition, the parking assistance device 10 may store attribute data (for example, "a parking lot of an own house" or "a parking lot of a workplace") of parking assistance data in the storage device 14*b*, and a passenger (for example, a driver) may select parking assistance data to be retrieved from the storage device 14*b*, based on the attribute data.

Figure 2B:
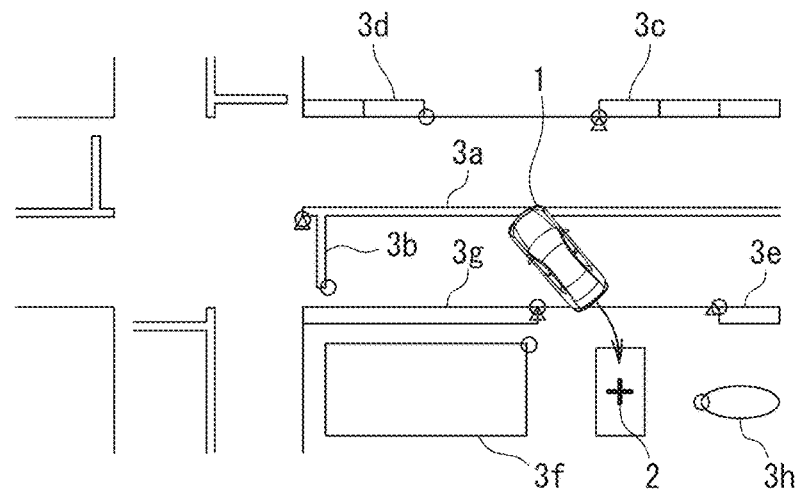
FIG. 2B is an explanatory diagram of an example of a parking assistance method.

Circular marks in FIG. 2B represent learned target objects retrieved from the storage device 14*b* in the parking assistance mode.

The parking assistance device 10 detects a target object around the own vehicle 1 and a target object position that is a relative position of the target object with respect to the own vehicle 1, by the object sensor 12. A detection method of a target object and a target object position is the same as the detection method in the target object learning mode.

A target object that the object sensor 12 detects in the parking assistance mode is indicated by a triangular mark. In the example in FIG. 2B, corner portions of the lane boundary line 3*a*, the curbs 3*c* and 3*e*, and the wall 3*g* are detected as feature points of target objects.

The parking assistance device 10 associates the same target objects with each other among the respective target objects detected by the object sensor 12 in the parking assistance mode (triangular marks) and the learned target objects stored in the storage device 14*b* (circular marks). For example, the parking assistance device 10 may determine target objects represented by feature points having the same or similar feature amounts to be the same target objects. In the example in FIG. 2B, the corner portions of each of the lane boundary line 3*a*, the curbs 3*c* and 3*e*, and the wall 3*g* are associated with each other.

The parking assistance device 10 calculates, based on relative positional relationships between the respective target objects detected in the parking assistance mode (triangular marks) and the own vehicle 1 and relative positional relationships between learned target objects (circular marks) associated with the detected target objects (triangular marks) and the target parking position 2, a relative position of the target parking position 2 with respect to the current position of the own vehicle 1. For example, the parking assistance device 10 may calculate the position of the target parking position 2 in a relative coordinate system with reference to the current position of the own vehicle 1 (hereinafter, referred to as a "vehicle coordinate system"). Alternatively, the parking assistance device 10 may calculate, based on the relative positional relationships between the respective target objects detected in the parking assistance mode (triangular marks) and the own vehicle 1 and the learned target objects in the fixed coordinate system (circular marks), the current position of the own vehicle 1 in the fixed coordinate system. The position of the own vehicle 1 and the position of the target parking position 2 in the fixed coordinate system being determined causes the relative position of the target parking position 2 with respect to the current position of the own vehicle 1 to be determined.

The parking assistance device 10 calculates, based on the relative position of the target parking position 2 with respect to the current position of the own vehicle 1, a target travel trajectory starting from the current position of the own vehicle 1 and reaching the target parking position 2. The parking assistance device 10 performs autonomous driving to control the own vehicle 1 to travel to the target parking position along the calculated target travel trajectory.

Estimating a relative position of the target parking position 2 with respect to the own vehicle 1 (hereinafter, also simply referred to as a relative position of the target parking position 2), based on the target objects detected by the sensor mounted on the own vehicle 1 and known relative positional relationships between the target parking position 2 and the target objects and controlling the own vehicle 1 to travel to the target parking position 2, as described above sometimes give the passenger a sense of discomfort. For example, since when estimation precision of the relative position of the target parking position 2 is low, precision of the control to cause the own vehicle 1 to travel to the target parking position 2 deteriorates, there is a risk that the passenger is given a sense of discomfort.

Therefore, when the parking assistance device 10 determines the estimation precision of the relative position of the target parking position 2 and the estimation precision is low, the parking assistance device 10 limits a speed limit of movement speed at which the own vehicle 1 is caused to travel along the target travel trajectory to a speed lower than a speed limit when the estimation precision is high. Because of this configuration, since when the estimation precision of the relative position of the target parking position 2 is low, the movement speed at which the own vehicle 1 travels to the target parking position 2 becomes low, a sense of discomfort given to the passenger can be suppressed.

Figure 3:
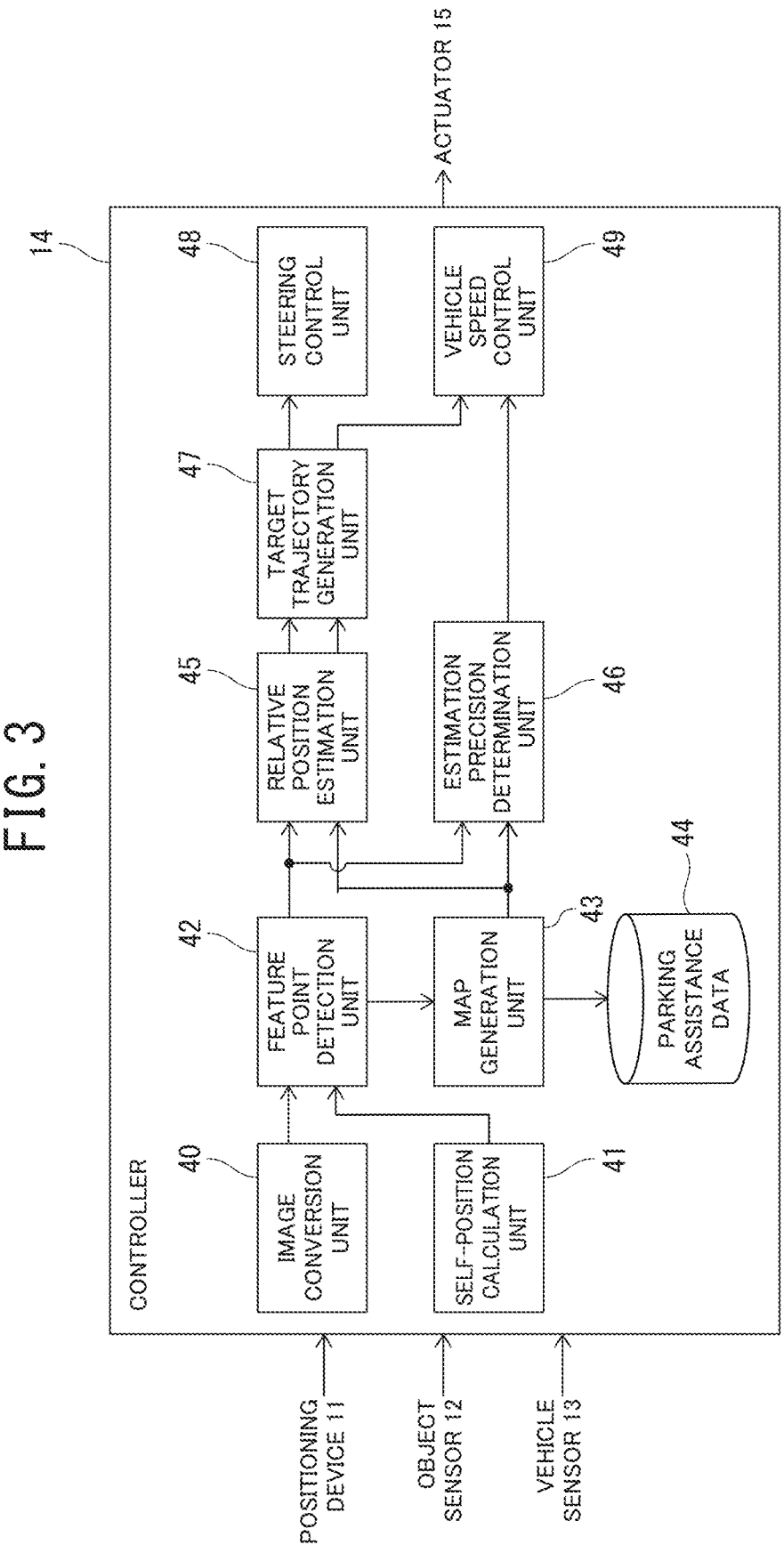
FIG. 3 is a block diagram of an example of a functional configuration of a controller in FIG. 1.

A functional configuration of the controller 14 will be described in more detail below. FIG. 3 is now referred to. The controller 14 functions as an image conversion unit 40, a self-position calculation unit 41, a feature point detection unit 42, a map generation unit 43, a relative position estimation unit 45, an estimation precision determination unit 46, a target trajectory generation unit 47, a steering control unit 48, and a vehicle speed control unit 49.

The image conversion unit 40 converts captured images captured by the camera of the object sensor 12 to a bird's eye image (an around view monitoring image) that is an image viewed from a virtual viewpoint directly above the own vehicle 1 as illustrated in FIGS. 2A and 2B. Hereinafter, a bird's eye image after conversion by the image conversion unit 40 is sometimes referred to as a "surrounding image".

FIG. 2A is a surrounding image in the target object learning mode, and FIG. 2B is a surrounding image in the parking assistance mode.

The self-position calculation unit 41 calculates a current position of the own vehicle 1 in the fixed coordinate system by dead reckoning or the like based on vehicle information output from the vehicle sensors 13. The self-position calculation unit 41 may correct the calculated current position by map mapping or the like between a target object detected by the object sensor 12 and a known target object position or the high-definition map information.

The feature point detection unit 42 detects a feature point of a target object around the own vehicle 1 from the surrounding image output from the image conversion unit 40 and calculates a feature amount of the feature point. The feature point detection unit 42 outputs the detected feature point and the feature amount of the feature point to the map generation unit 43 and the relative position estimation unit 45 in conjunction with the current position of the own vehicle 1 received from the self-position calculation unit 41.

In the target object learning mode, the map generation unit 43 stores feature point information including a feature point output from the feature point detection unit 42 while the driver parks the own vehicle 1 at the target parking position 2 by manual driving, a current position of the own vehicle 1 synchronized with the feature point, and a feature amount of the feature point, in the storage device 14b as parking assistance data 44. The map generation unit 43 may calculate a position of a feature point in the fixed coordinate system, based on the current position of the own vehicle 1 and store the calculated position as feature point information.

In addition, when the current position of the own vehicle 1 reaches the target parking position 2, the map generation unit 43 receives the current position of the own vehicle 1 in the fixed coordinate system from the positioning device 11 or the self-position calculation unit 41 and stores the target parking position 2 in the storage device 14b as the parking assistance data 44. For example, the driver may operate a human-machine interface (not illustrated) of the parking assistance device 10 and instruct that the current position of the own vehicle 1 is the target parking position 2. Through this operation, the storage device 14b stores a relative positional relationship between the position of a feature point detected in the target object learning mode and the position of the target parking position 2 and the feature amount of the feature point in the storage device 14b as the parking assistance data 44. Note that the parking assistance data 44 stored in the storage device 14b are only required to include at least a relative positional relationship between the position of a feature point and the position of the target parking position 2 and do not necessarily have to include the feature amount of the feature point. Hereinafter, information including the position of a feature point or the position and feature amount of a feature point is also referred to as feature point information.

When the operating mode of the parking assistance device 10 is switched to the parking assistance mode, the relative position estimation unit 45 retrieves the parking assistance data 44 from the storage device 14b. The relative position estimation unit 45, by matching feature point information of learned target objects stored as the parking assistance data 44 (circular marks in FIG. 2A) with feature point information that the feature point detection unit 42 outputs from a captured image output from the camera of the object sensor 12 in the parking assistance mode (triangular marks in FIG. 2B), associates pieces of feature point information detected with respected to the same target object with each other.

The relative position estimation unit 45 estimates, based on relative positional relationships between the feature points detected in the parking assistance mode (triangular marks) and the own vehicle 1 and relative positional relationships between the feature point information of learned target objects (circular marks) associated with the detected feature points (triangular marks) and the target parking position 2, a relative position of the target parking position 2 with respect to the current position of the own vehicle 1.

For example, feature points detected in the parking assistance mode are denoted by $(x_i, y_i)$, and feature points of learned target objects each of which is associated with one of the feature points $(x_i, y_i)$ are denoted by $(x_{mi}, y_{mi})$ (i=1 to N). For example, the relative position estimation unit 45 may calculate an affine transformation matrix Mime, using the following equation, based on a least-square method.

$$\begin{bmatrix} a_1 \\ a_2 \\ a_3 \\ a_4 \end{bmatrix} = [X_X^T X_X]^{-1} X_X^T X_{tfm} \text{ where}$$
[Math 1]

$$X_X = \begin{bmatrix} x_{m1} & y_{m1} & 1 & 0 \\ y_{m1} & -x_{m1} & 0 & 1 \\ \vdots & \vdots & \vdots & \vdots \\ x_{mN} & y_{mN} & 1 & 0 \\ y_{mN} & -x_{mN} & 0 & 1 \end{bmatrix} X_{tfm} = \begin{bmatrix} x_1 \\ y_1 \\ \vdots \\ x_N \\ y_N \end{bmatrix} M_{affine} = \begin{bmatrix} a_1 & a_2 & a_3 \\ -a_2 & a_1 & a_4 \end{bmatrix}$$

The relative position estimation unit 45 may calculate a column vector $(a_1, a_2, a_3, a_4)^T$ as in the following equation, using a least-square method.

$$W = \mathrm{diag}(w_1 \ldots w_N) \begin{bmatrix} a_1 \\ a_2 \\ a_3 \\ a_4 \end{bmatrix} = [X_X^T W X_X]^{-1} X_X^T W X_{tfm}$$
[Math 2]

The relative position estimation unit 45 converts a position (targetx$_m$, targety$_m$) of the target parking position 2 in the fixed coordinate system, which is stored in the parking assistance data 44, to a position (targetx, targety) in the vehicle coordinate system, using the following equation.

$$\begin{Bmatrix} targetx \\ targety \end{Bmatrix} = M_{affine} \begin{Bmatrix} targetx_m \\ targety_m \\ 1 \end{Bmatrix}$$
[Math 3]

Instead of this configuration, the relative position estimation unit 45 may assume positions $(x_{mi}, y_{mi})$ in the vehicle coordinate system of feature points of learned target objects (i=1 to N), calculate a distance $d_i$ (i.e. a positional error) between a feature point $(x_i, y_i)$ of each target object detected in the parking assistance mode and a feature point $(x_{mi}, y_{mi})$ of a learned target object associated with the feature point $(x_i, y_i)$, and determine positions of the feature points of the learned target objects in the vehicle coordinate system in such a manner as to minimize an average $S=(d_1+d_2+\ldots+d_N)/N$ of the distances $d_i$.

The relative position estimation unit 45 may calculate, based on the determined positions of the feature points of the learned target objects in the vehicle coordinate system and relative positional relationships between the positions of the feature points of the learned target objects and the target parking position 2, the position (targetx, targety) in the vehicle coordinate system of the target parking position 2.

The estimation precision determination unit 46 determines estimation precision of the relative position of the target parking position 2 with respect to the current position of the own vehicle 1, the relative position being estimated by the relative position estimation unit 45.

For example, when the number of feature points detected in the parking assistance mode is small, the estimation precision determination unit 46 may determine that the estimation precision is lower than estimation precision when the number of detected feature points is large. For example, the estimation precision determination unit 46 may determine that the smaller the number of feature points detected in the parking assistance mode is, the lower the estimation precision is.

In addition, for example, when the number of learned target objects is small, the estimation precision determination unit 46 may determine that the estimation precision is lower than estimation precision when the number of learned target objects is large. For example, the estimation precision determination unit 46 may determine that the smaller the number of learned target objects is, the lower the estimation precision is.

That is, when the number of feature points detected in the parking assistance mode or the number of learned target objects is small, the number of learned target objects associated with feature points detected in the parking assistance mode becomes small and there is a possibility that the estimation precision of the relative position of the target parking position 2 with respect to the current position of the own vehicle 1 deteriorates. Thus, the estimation precision determination unit 46 may estimate the estimation precision, assuming a case where all of one of feature points detected in the parking assistance mode and learned target objects the number of which is smaller than the other are associated with the other, and determine that the smaller the number of the one the number of which is smaller than the other is, the lower the estimation precision is.

In addition, for example, when the number of learned target objects associated with feature points detected in the parking assistance mode is small, the estimation precision determination unit 46 may determine that the estimation precision is lower than estimation precision when the number of learned target objects associated with feature points detected in the parking assistance mode is large. For example, the estimation precision determination unit 46 may determine that the smaller the number of learned target objects associated with feature points detected in the parking assistance mode is, the lower the estimation precision is.

In addition, for example, when a minimum value of the average $S=(d_1+d_2+\ldots+d_N)/N$ of distances (positional error) $d_i$ between the positions of detected target objects and the positions of the feature points of learned target objects after the target objects detected in the parking assistance mode and the feature points of the learned target objects are subjected to matching (position alignment) is large, the estimation precision determination unit 46 may determine that the estimation precision is lower than estimation precision when the minimum value of the average S is small. The estimation precision determination unit 46 may determine that the larger the average S is, the lower the estimation precision is.

In addition, for example, when a residual when an affine transformation matrix $M_{affine}$ is calculated, based on a least-square method is large, the estimation precision determination unit 46 may determine that the estimation precision is lower than estimation precision when the residual is small. The estimation precision determination unit 46 may determine that the larger the residual is, the lower the estimation precision is.

The target trajectory generation unit 47 generates a target travel trajectory starting from the current position of the own vehicle 1 in the vehicle coordinate system (that is, the coordinate origin) and reaching the position (targetx, targety) in the vehicle coordinate system of the target parking position 2. Note that the target travel trajectory can be generated by, for example, connecting a clothoid curve from the current position of the own vehicle 1 to the target parking position 2.

In addition, the target trajectory generation unit 47 calculates a movement speed plan (movement speed profile) in which movement speed at each position on the target travel trajectory from the current position of the own vehicle to the target parking position 2 is set. For example, the target trajectory generation unit 47 calculates a movement speed at each position on the target travel trajectory in such a way that the own vehicle 1, from a state of standing still at the current position of the own vehicle, accelerates to a predetermined speed limit at a predetermined acceleration, subsequently decelerates from the speed limit at a predetermined deceleration, and stops at the target parking position 2. The target trajectory generation unit 47 may set the movement speed in such a manner that the larger the curvature of the target travel trajectory at a point is, the lower the movement speed at the point is.

The steering control unit 48 controls the steering actuator in the actuators 15 in such a way that the own vehicle 1 travels along the target travel trajectory.

In addition, the vehicle speed control unit 49 controls an accelerator actuator and a brake actuator in the actuators 15 in such a way that the vehicle speed of the own vehicle 1 changes in accordance with the movement speed plan that the target trajectory generation unit 47 calculated. Because of this configuration, the own vehicle 1 is controlled to travel along the target travel trajectory.

When the estimation precision of the relative position of the target parking position 2 that the estimation precision determination unit 46 determined is low, the vehicle speed control unit 49 limits the speed limit of the movement speed at which the own vehicle 1 is caused to travel along the target travel trajectory to a speed lower than a speed limit when the estimation precision is high. For example, the vehicle speed control unit 49 sets the speed limit in such a manner that the lower the estimation precision is, the lower the speed limit is.

For example, the vehicle speed control unit 49 may calculate a corrected movement speed plan by correcting movement speed at a position at which a movement speed higher than a speed limit that is set according to the estimation precision is set in the movement speed plan calculated by the target trajectory generation unit 47 to the speed limit. The vehicle speed control unit 49 may control the accelerator actuator and the brake actuator in the actuators 15 in such a way that the vehicle speed of the own vehicle 1 changes in accordance with the corrected movement speed plan.

In addition, the vehicle speed control unit 49, when controlling the speed of the own vehicle 1 in accordance with the movement speed plan that the target trajectory generation unit 47 calculated, may determine whether or not the movement speed of the own vehicle 1, which the vehicle speed sensor in the vehicle sensors 13 detects, is higher than the speed limit that is set according to the estimation precision. When the movement speed of the own vehicle 1 is higher than the speed limit, the vehicle speed control unit 49 may control the movement speed of the own vehicle to less than or equal to the speed limit.

In addition, the vehicle speed control unit 49 may determine whether or not distance from the own vehicle 1 to an obstacle around the own vehicle 1 is less than a predetermined threshold and, when the distance from the own vehicle 1 to the obstacle is less than the predetermined threshold, cause the own vehicle 1 to stop. Distance information from the own vehicle 1 to an obstacle around the own vehicle 1 may be detected by, for example, the object sensor 12.

Note that the target trajectory generation unit 47 may calculate a target travel trajectory only once when the parking assistance by the parking assistance device 10 is started or may, after the own vehicle 1 starts travel to the target parking position 2 along a target travel trajectory, regenerate a target travel trajectory and update the original target travel trajectory. For example, the target trajectory generation unit 47 may repeatedly update a target travel trajectory at a predetermined period.

When a target travel trajectory is to be updated, the feature point detection unit 42 detects a feature point of a target object around the own vehicle 1 from an image captured by the camera of the object sensor 12 after travel to the target parking position 2 is started.

The relative position estimation unit 45, by associating a feature point that the feature point detection unit 42 detects after travel to the target parking position 2 is started with a feature point of a learned target object that is stored as the parking assistance data 44, re-estimates a relative position of the target parking position 2 with respect to the current position of the own vehicle 1. In addition, the estimation precision determination unit 46 determines estimation precision of the re-estimated relative position of the target parking position 2. In general, since the closer the own vehicle 1 comes to the target parking position 2, the larger the number of detected target objects that can be associated with learned target objects becomes, the estimation precision tends to increase.

The target trajectory generation unit 47 regenerates, based on the re-estimated relative position of the target parking position 2, a target travel trajectory starting from the current position of the own vehicle 1 and reaching the target parking position 2. In addition, the target trajectory generation unit 47 updates the movement speed plan, based on the regenerated target travel trajectory. On this occasion, the target trajectory generation unit 47 sets a current vehicle speed of the own vehicle 1 that the vehicle sensors 13 detected to a movement speed (initial value) at the current position.

The steering control unit 48 controls the steering actuator in such a way that the own vehicle 1 travels along the regenerated target travel trajectory. The vehicle speed control unit 49 controls the actuators 15 in such a way that the vehicle speed of the own vehicle 1 changes in accordance with the updated movement speed plan.

According to estimation precision of the re-estimated relative position of the target parking position 2, when the estimation precision is low, the vehicle speed control unit 49 limits the speed limit of the movement speed at which the own vehicle 1 is caused to travel along the target travel trajectory to a speed lower than a speed limit when the estimation precision is high.

(Operation)

FIG. 4 is a flowchart of an example of operation of the parking assistance device 10 in the parking assistance mode.

In step S1, the positioning device 11 measures a current position of the own vehicle 1 in the fixed coordinate system.

In step S2, the object sensor 12 detects a feature point of a target object around the own vehicle 1.

In step S3, the relative position estimation unit 45 of the controller 14 retrieves parking assistance data corresponding to the current position of the own vehicle 1 from the storage device 14*b*.

In step S4, the relative position estimation unit 45 determines an association between the feature point of the target object detected in step S2 and a feature point of a known target object in the parking assistance data retrieved in step S3.

In step S5, the relative position estimation unit 45 estimates, based on a relative position of the feature point of the target object detected in step S2 with respect to the own vehicle 1 and a relative positional relationship between the feature point of the known target object associated with the feature point of the target object detected in step S2 and the target parking position 2, a relative position of the target parking position 2 with respect to the own vehicle 1.

In step S6, the estimation precision determination unit 46 determines estimation precision of the relative position in step S5.

In step S7, when the estimation precision determined in step S6 is low, the vehicle speed control unit 49 limits a speed limit of movement speed at which the own vehicle 1 is caused to travel to the target parking position 2 to a speed lower than a speed limit when the estimation precision is high.

In step S8, the target trajectory generation unit 47 generates, based on the relative position of the target parking position 2 with respect to the own vehicle 1 that is estimated in step S5, a target travel trajectory that the own vehicle is caused to travel from the current position of the own vehicle 1 to the target parking position 2.

In step S9, the target trajectory generation unit 47 calculates a movement speed plan in which movement speed at each position on the target travel trajectory is set.

In step S10, the vehicle speed control unit 49 limits the movement speed plan calculated in step S9 by the speed limit set in step S7.

In step S11, the steering control unit 48 controls a steering angle in such a way that the own vehicle 1 travels along the target travel trajectory generated in step S8. The vehicle speed control unit 49 controls the movement speed of the own vehicle 1 in accordance with the movement speed plan limited in step S10. When the own vehicle 1 reaches the target parking position 2, the process terminates.

Advantageous Effects of Embodiment (1) The object sensor 12 detects a target object around the own vehicle 1 and a target object position that is a relative position of the target object with respect to the own vehicle 1. The controller 14: retrieves a known target object and a relative positional relationship between the known target object and a target parking position that are stored in the predetermined storage device 14*b* in advance, from the storage device 14*b*; based on the target object position detected by the object sensor 12 and the relative positional relationship between the known target object and the target parking position, estimates a relative position of the target parking position with respect to the current position of the own vehicle 1; based on the estimated relative position, calculates a target travel trajectory from the current position of the own vehicle 1 to the relative position of the target parking position; determines estimation precision of the estimated relative position; and, when the estimation precision is low, limits a speed limit of movement speed at which the own vehicle 1 is caused to travel along the target travel trajectory to a speed lower than a speed limit when the estimation precision is high.

Since because of this configuration, when the estimation precision of the relative position of the target parking position 2 is low, the movement speed at which the own vehicle 1 travels to the target parking position 2 becomes low, a sense of discomfort given to the passenger can be suppressed. That is, when, for example, the estimation precision of the relative position of the target parking position 2 is low, calculation precision of a target travel trajectory from the current position of the own vehicle 1 to the relative position of the target parking position also becomes low and there is a possibility that it becomes difficult to generate an optimum target travel trajectory. Although in such a case, there is a possibility that fast movement speed of the own vehicle 1 gives the driver a sense of discomfort, lowering the movement speed enables the sense of discomfort given to the passenger to be suppressed.

(2) The controller 14 may determine that when the number of target objects detected by the object sensor 12 is small, the estimation precision is lower than estimation precision when the number of target objects is large.

The controller 14 may determine that when the number of known target objects stored in the storage device 14*b* is small, the estimation precision is lower than estimation precision when the number of known target objects is large.

The controller 14 may, by associating a target object detected by the object sensor 12 with a known target object stored in the storage device 14*b*, estimate a relative position of the target parking position with respect to the current position of the own vehicle 1 and, when the number of known target objects associated with target objects detected by the object sensor 12 is small, determine that estimation precision is lower than estimation precision when the number of known target objects associated with target objects detected by the object sensor 12 is large.

The controller 14 may estimate a relative position of the target parking position with respect to the current position of the own vehicle 1 in such a manner that an average of respective distances between a plurality of target objects detected by the object sensor 12 and a plurality of known target objects stored in the storage device 14*b* becomes small and, when the average is large, determine that the estimation precision is lower than estimation precision when the average is small.

Because of this configuration, it is possible to determine estimation precision of the relative position of the target parking position with respect to the current position of the own vehicle 1.

(3) The controller 14 may calculate a movement speed plan in which movement speed at each position on a target travel trajectory from the current position of the own vehicle 1 to the target parking position is set, calculate a corrected movement speed plan by correcting movement speed at a position at which a movement speed higher than a speed limit is set in the movement speed plan, to the speed limit, and based on the corrected movement speed plan, control the movement speed at which the own vehicle 1 is caused to travel along the target travel trajectory.

Because of this configuration, it is possible to limit the movement speed at which the own vehicle 1 is caused to travel along the target travel trajectory, according to the estimation precision of a relative position.

(4) The vehicle sensor 13 detects movement speed of the own vehicle 1. When the movement speed of the own vehicle 1 traveling along the target travel trajectory is higher than a speed limit, the controller 14 may control the movement speed of the own vehicle 1 to less than or equal to the speed limit.

Because of this configuration, it is possible to limit the movement speed at which the own vehicle 1 is caused to travel along the target travel trajectory, according to the estimation precision of a relative position.

(5) Distance from the own vehicle 1 to an obstacle around the own vehicle 1 may be detected by the object sensor 12, and when the detected distance is less than a predetermined distance, the own vehicle may be caused to stop.

Because of this configuration, it is possible to reduce a sense of discomfort given to the passenger caused by the own vehicle 1 coming too close to an obstacle.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
2 Target parking position
3*a* Lane boundary line
3*b* Stop line
3*c* to 3*e* Curb
3*f* House
3*g* Wall
3*h* object
10 Parking assistance device
11 Positioning device
12 Object sensor
13 Vehicle sensor
14 Controller
14*a* Processor
14*b* Storage device
15 Actuator
40 Image conversion unit
41 Self-position calculation unit
42 Feature point detection unit
43 Map generation unit
44 Parking assistance data
45 Relative position estimation unit
46 Estimation precision determination unit
47 Target trajectory generation unit
48 Steering control unit
49 Vehicle speed control unit

The invention claimed is:
1. A parking assistance method comprising:
by a sensor mounted on an own vehicle, detecting a target object around the own vehicle and a target object position, the target object position being a relative position of the target object with respect to the own vehicle;

retrieving a known target object and a relative positional relationship between the known target object and a target parking position, the known target object and the relative positional relationship being stored in a storage device in advance, from the storage device;

based on a target object position detected by the sensor and a relative positional relationship between the known target object and a target parking position, estimating a relative position of the target parking position with respect to a current position of the own vehicle;

based on the estimated relative position, calculating a target travel trajectory from a current position of the own vehicle to a relative position of the target parking position;

determining estimation precision of the estimated relative position; and when the estimation precision is low, limiting a speed limit of movement speed at which the own vehicle is caused to travel along the target travel trajectory to a speed lower than a speed limit when the estimation precision is high.

2. The parking assistance method according to claim 1, wherein when a number of target objects detected by the sensor is small, the parking assistance method determines that the estimation precision is lower than the estimation precision when the number of the target objects is large.

3. The parking assistance method according to claim 1, wherein when a number of known target objects stored in the storage device is small, the parking assistance method determines that the estimation precision is lower than the estimation precision when the number of the known target objects is large.

4. The parking assistance method according to claim 1, wherein
the parking assistance method, by associating the target object detected by the sensor with the known target object stored in the storage device, estimates a relative position of the target parking position with respect to a current position of the own vehicle, and when a number of known target objects associated with target objects detected by the sensor is small, the parking assistance method determines that the estimation precision is lower than the estimation precision when the number of the known target objects associated with the target objects detected by the sensor is large.

5. The parking assistance method according to claim 1, wherein
the parking assistance method estimates a relative position of the target parking position with respect to a current position of the own vehicle in such a manner that an average of respective distances between a plurality of target objects detected by the sensor and a plurality of known target objects stored in the storage device becomes small, and when the average is large, the parking assistance method determines that the estimation precision is lower than the estimation precision when the average is small.

6. The parking assistance method according to claim 1 comprising:
calculating a movement speed plan in which movement speed at each position on the target travel trajectory from a current position of the own vehicle to the target parking position is set;

calculating a corrected movement speed plan by correcting movement speed at a position at which a movement speed higher than the speed limit is set in the movement speed plan, to the speed limit; and based on the corrected movement speed plan, controlling movement speed at which the own vehicle is caused to travel along the target travel trajectory.

7. The parking assistance method according to claim 1 comprising:
detecting movement speed of the own vehicle; and when movement speed of the own vehicle traveling along the target travel trajectory is higher than the speed limit, controlling movement speed of the own vehicle to less than or equal to the speed limit.

8. The parking assistance method according to claim 1 comprising: detecting distance from the own vehicle to an obstacle around the own vehicle by the sensor; and when detected distance is less than a predetermined distance, causing the own vehicle to stop.

9. A parking assistance device comprising:
a sensor mounted on an own vehicle and configured to detect a target object around the own vehicle and a target object position, the target object position being a relative position of the target object with respect to the own vehicle;

a storage device configured to store a known target object and a relative positional relationship between the known target object and a target parking position; and a controller configured to: based on a target object position detected by the sensor and a relative positional relationship between the known target object and a target parking position, estimate a relative position of the target parking position with respect to a current position of the own vehicle; based on the estimated relative position, calculate a target travel trajectory from a current position of the own vehicle to a relative position of the target parking position; determine estimation precision of the estimated relative position; and when the estimation precision is low, limit a speed limit of movement speed at which the own vehicle is caused to travel along the target travel trajectory to a speed lower than a speed limit when the estimation precision is high.

* * * * *